United States Patent [19]

Vandigriff

[11] 4,435,649

[45] Mar. 6, 1984

[54] AUTOMOTIVE CONTROL CIRCUIT

[76] Inventor: John F. Vandigriff, Box 179, Mansfield, Tex. 76063

[21] Appl. No.: 328,031

[22] Filed: Dec. 7, 1981

[51] Int. Cl.³ .............................................. B60R 25/04
[52] U.S. Cl. ................................ 307/10 AT; 361/171; 340/64; 180/287
[58] Field of Search ................... 307/10 AT; 361/172, 361/171; 180/287; 340/63, 64, 825, 32, 147 MD, 542, 543; 70/278

[56] References Cited

U.S. PATENT DOCUMENTS

| | | | |
|---|---|---|---|
| 3,809,915 | 5/1974 | Bost | 307/10 AT |
| 4,327,353 | 4/1982 | Beard et al. | 307/10 AT |
| 4,347,545 | 8/1982 | Weishaupt et al. | 307/10 AT |

FOREIGN PATENT DOCUMENTS 2708701  9/1978  Fed. Rep. of Germany ........ 302/10 AT Primary Examiner—E. A. Goldberg
Assistant Examiner—Todd E. De Boer

[57] ABSTRACT

An automotive Control Circuit is described which controls several electrical functions of an automotive electrical system. A digital encoded key enables ignition and electrical fuel pump circuits. The same circuits are utilized to provide an anti thief circuit to disable the automotive electrical system when attempts are made to hot wire the auto ignition circuit.

4 Claims, 7 Drawing Figures

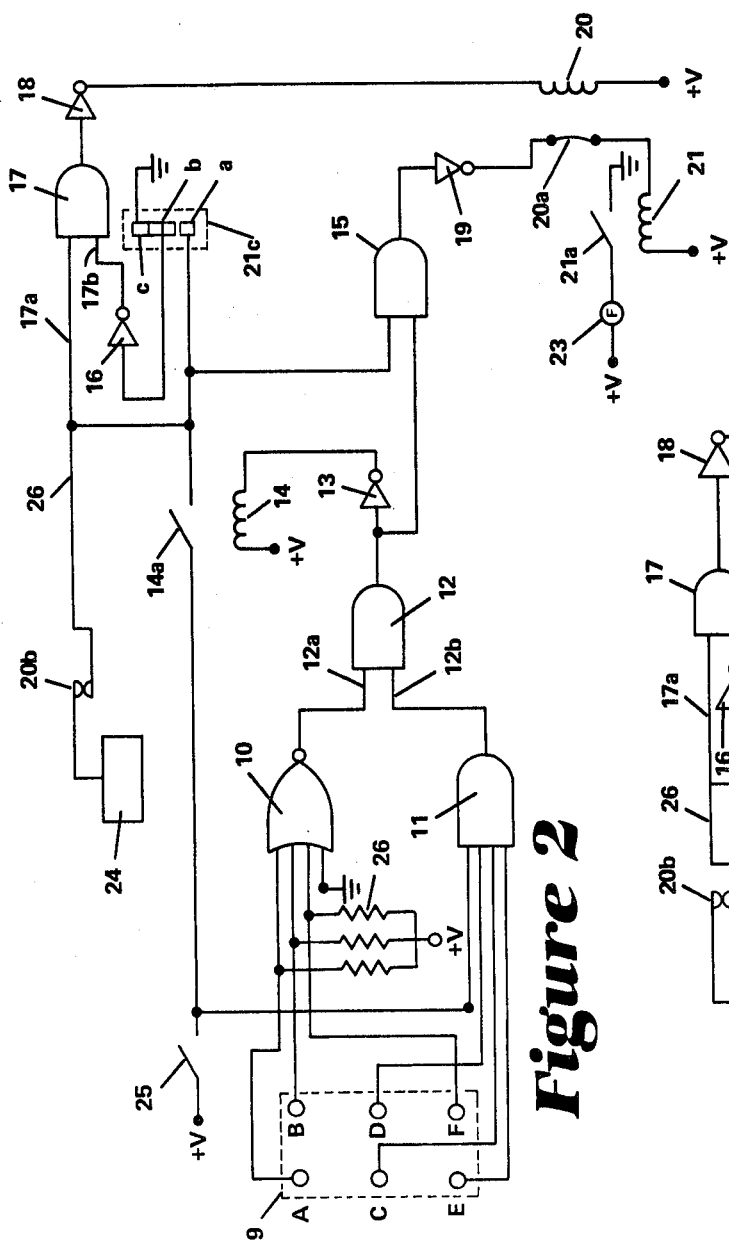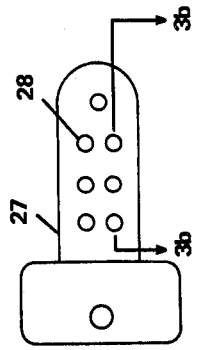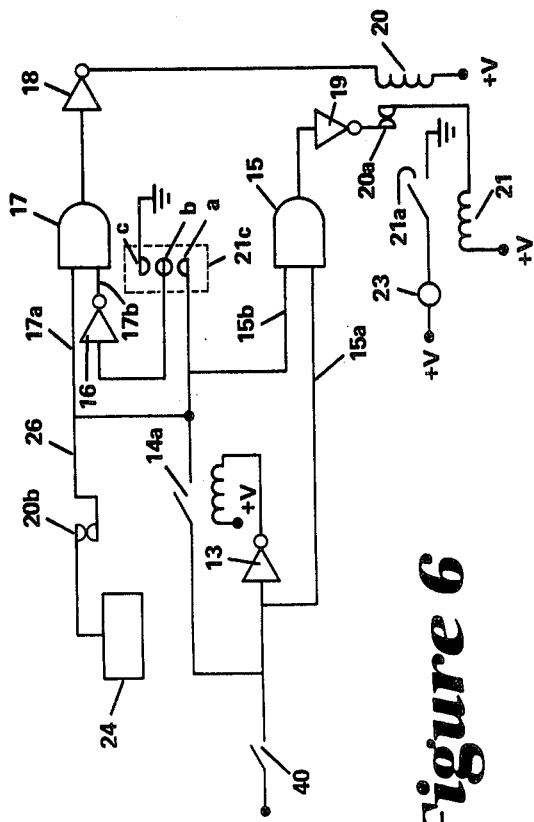

AUTOMOTIVE CONTROL CIRCUIT

FIELD OF THE INVENTION

This invention relates to electrical control circuits and more particularly to control circuits for automotive electrical systems.

BACKGROUND OF THE INVENTION

For years automotive electrical systems have utilized a simple keylock ignition system to turn on the electrical functions of the automobile. The ignition lock has been basically a mechanical device attached to an electrical switch. Theft prevention measures have been limited to a mechanical locking of the steering column with the ignition lock. Such mechanical devices are disabled by pulling the ignition lock tumbler from its enclosure. Thereafter the automobile can be "hot wired" and stolen.

SUMMARY OF THE INVENTION

The present invention was developed to fill a need for an inexpensive automotive electrical system control circuit and to incorporate therein an effective antitheft circuit. In its simplest form the logic control circuit can utilize low cost logic gates and inverter amplifiers which are readily available in about three integrated circuits, each costing under one dollar each. The invention can also be utilized with automotive electrical systems which are controlled by microprocessors.

In one aspect of the invention, a digital encoded key is used in the ignition system. The system responds to the coding on the key to turn-on the electrical functions of the automobile such as ignition, electrical fuel pump, microprocessor (if there is one) and any other electrical function needed or desired upon starting of the automobile.

In the event an attempt is made to steal the automobile by bypassing the normal ignition circuit, for example, hot wiring, the control circuit detects a non standard connection to the ignition system and in response thereto disables the electrical functions of the automobile thereby preventing ignition and starting of the automobile. The basic functions such as those required to start and operate the automobile, for example, ignition, power to starter, power to an electrical fuel pump, etc. are those circuit/functions best controlled by the invention.

Other features of the invention and the technical advances represented thereby will be readily understood when the following description and claims are read in conjunction with the drawings in which:

FIG. 2 is a circuit diagram of one embodiment of the invention;

FIG. 3a and 3b illustrates a digital encoded key which may be used in the invention;

FIG. 6 is another embodiment of the invention using a standard key-type ignition/start assembly.

Figure 1:
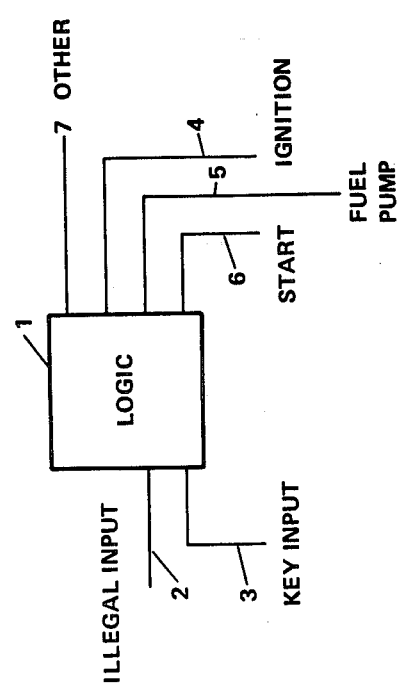
FIG. 1 is a block diagram of the basic invention.

FIG. 1 is a block representation of the invention in its simplest form. Block 1 is the logic or control circuits which implements the automotive control functions and detects non-standard electrical connections to the electrical system. It may be simple digital logic according to the example hereinafter given or may be a microprocessor depending upon the complexity and degree of control/automation desired in the electrical system. Key input 3 initiates the control procedures. Depending upon the degree of control and functions provided by the key, the logic is caused to perform or give instructions to perform those functions to initiate starting of the automobile. For example, Logic 1 may instruct the system to provide power to the ignition 4, to the fuel pump 5 and to the electrical starter 6. Other functions may also be provided at 7. For example, there could be a provision to release brakes, if the auto were to have the brakes automatically applied during non power up conditions of the automobile electrical system. Additionally, a transmission lock could be used in a non power-up condition.

Illegal or nonstart input 2 results from applying power to, for example, the ignition system in a manner not intended such as the hot wiring of the automobile in order to steal it. When logic 1 detects this nonstandard input it automatically powers down one or more the aforementioned electrical functions to prevent operation of the automobile.

FIG. 2 embodies one example of a logic circuit 1 (FIG. 1) which may be used in the present invention. Input 9 represents the key input 3 and is a digitally encoded input. The encoded input by an encode key, hereinafter described, applies a coded digital word to logic gates 10 and 11. Gate 10 is a four input NOR gate and gate 11 is a four input AND gate. These inputs to gate 10 are part of the coded digital word and upon insertion of key 27 (FIGS. 3a and 3b) a logic "0" (ground) is applied to gate 10. The fourth input to gate 10 is also a logic "0" as illustrated. During the time the key is not inserted, the input to gates 10 and 11 are stabilized by resistors 50 and 51, respectively.

Gate 11 has four logic "1's" applied thereto. A logic 1 is defined as the automotive battery voltage. A logic 1 is automatically applied from the electrical system during power-up conditions and the other logic "1s" are applied when key 27 is inserted into key-in assembly 9.

The output of gate 10, when four logic "0s" are applied is a logic 1, and the output is applied to input 12a of AND gate 12. The output of gate 11 is a logic 1 and is applied to input 12b of gate 12. The output of gate 12 is a logic 1. This output is applied to the input of inverting amplifier 13 and AND gate 15.

When the logic 1 is applied to inverter applifier 13, its output goes low causing relay 14 to operate, closing contacts 14a and applying power to ignition line 26. Switch 25 has previously been closed by the insertion of key 27 into key input assembly 9.

With the application of a logic 1 to one input of gate 15 and the application of another logic 1 to the other input via the closing of contact 14a (the 12 V of the automative electrical system is defined as a logic 1 and ground is a logic 0) the output of gate 15 will be a logic 1. This output when applied to inverting amplifier 19 will cause relay 21 to operate, closing contact 21a thereby applying power to electric fuel pump 23 and through normally closed contact 20b to ignition 24. Through the foregoing sequence the automobile is ready to start. The starter motor (not illustrated) maybe turned on by, for example, a separate switch and/or separate control circuit/relay (not illustrated) used in conjunction with key 27 and key input assembly 9.

In the event a key 27 is not inserted into key-input 9 and a voltage is applied to line 26, as occurs when an attempt is made to steal the automobile by hot wiring, the following sequence occurs. With the application of the voltage to line 26, a logic 1 is applied to one input 17a of AND gate 17. The other input 17b to gate 17 has connected thereto a set of contacts from relay 21, connected through inverting amplifier 16. Contacts 21C is the equivelent of a single pole double throw switch. The contacts are normally in the upper position (bc) grounding the input of inverting amplifier 16. However when relay 21 is actuated through a normal starting of the automobile by using key 27, the contacts 21C will be in the lower position (ab) applying a logic 1 to inverting amplifier 16 via a logic 0 to the input of gate 17. Since a logic 1 is applied via line 26 to the other input of gate 17, the output of gate 17 remains low, or a logic 0. However when there is not a normal start operation and an attempt is made to hot wire the automobile by applying a voltage (logic 1) to lines 26, contact 21c is in the upper position (bc), grounding the input of invertering amplifier 16. This condition applies a logic 1 to input 17b of gate 17. With the logic 1 to input 17a of gate 17 the output of gate 17 goes to a logic 1 actuating relay 20 through inverting amplifier 18. When relay 20 is actuated normally closed contacts 20a and 20b are opened thereby preventing the application of power to fuel pump 23 via relay 21 and the ignition system 24 via contacts 20b.

Gates 10, 11 and 12 may be replaced with a EPROM with eight input lines. The EPROM can be programmed for up to 254 different combinations.

FIGS. 3a and 3b illustrates a key having code means thereon which are suitable for use with key assembly 9, FIG. 2. Encoding is accomplished by the way of raised or indented regions 28. The regions are illustrated in more detail in FIG. 3b. Encoding is accomplished by having a pattern of the raised or indented region 28 on the key or having neither (flat area). The coded areas match the combinations of contacts A through F on key assembly 9. Gates 10 and 11 can be electrically connected to decode the patterns or raised or indented areas and/or flat areas.

Figure 4:
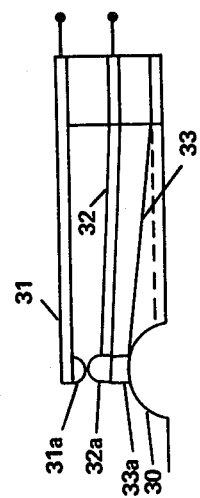
FIG. 4 and 5 are contact arrangements which may be used with the key of FIG. 3a and 3b.
Figure 5:
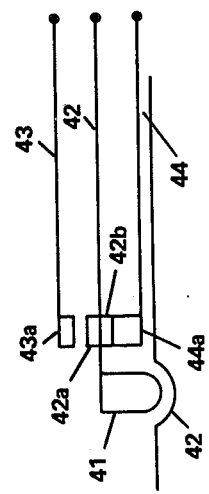

Examples of contacts useful with key 27 are illustrated in FIGS. 4 and 5.

FIG. 4 illustrates a contact useful with a raised portion 30. As the raised portion of the key moves under element 33a connected to spring 33, element 33a moves contact 32a into engagement with contact element 31a conclosing a circuit connected between elements 31 and 32.

In FIG. 5 a contact arrangement for use with an indention is illustrated.

Contact element 41 is on one end of contact 42, which also has electrical contact points 42a and 42b thereon. In the normal unactuated position element 42a is in contact with electrical contact point 44a on the end of contact 44. When the key is inserted element 41 resides in indention 40 and electrical contact point 42a is pushed up into contact with eletrical point 43a closing the connection between 42 and 43. Indention is not so deep as to allow contact points 42a and 44a to be in electrical contact.

The contact arrangements illustrated in FIGS. 4 and 5 are given by way of example only. Other equally usable arrangements for use with key 27 are possible.

FIG. 6 illustrates a simplified circuit of the present invention for use with a key switch typically used with automobiles. When key switch 40 is closed power is applied to inverting amplifier, actuating relay 14 and closing contacts 14a. Keyswitch also supplies a voltage to input 15a of gate 15. When contact 14a closes, a voltage is applied to input 15b of gate 15.

With voltages applied to both inputs of gate 15, relay 21 actuates closing contacts 21a, supplying power to, for example, fuel pump 23. Contacts 20a and 20b are normally closed so power is supplied to fuel pump 23 and ignition system 24.

In the event an attempt to steal the automobile is made without a key, the aforementioned sequence does not take place.

To hot wire the automobile a jumper connection is made to apply a voltage to the ignition system at line 26. This puts a voltage (logic 1) on input 17a to gate 17. With the key ignition system in the off condition contact 21 is such that contact points b and c are engaged grounding the input to inverting amplifier 16 thereby applying a voltage (logic 1) to input 17b of gate 17. With a logic 1 on each input of gate 17, relay 20 is actuated opening normally closed contacts 20a and 2b preventing the application of power to fuel pump 23 and ignition system 24.

Technically the above system could be avoided by using numerous jumper wires, but with the strategic placement of the contact points of the several relays and gates under the dash board of the automobile and the use of plastic encapulation, the accessibility of the required connection points can be made almost impossible, making it very difficult to overcome the antitheft circuit.

Mechanical relays have been used in the foregoing circuits for purpose of illustration only but they may be replaced with transistors or other electronic switches. While not specifically illustrated, an additional feature of the invention may be that upon jumping of the ignition system the relays and/or gates are mechanically or electrically locked in to the operation condition and are not unlocked until the power key is inserted in the keyswitch assembly and the key switch turned on.

While specific embodiments have been illustrated in the several figures, other circuits and features are deemed to fall within the scope of the invention as defined by the following claims.

What is claimed:

1. An antitheft circuit for detecting nonstandard connections to an automobile electrical system comprising, means including a key circuit for supplying power and control signals to the electrical system, a logic circuit, said logic circuit upon receipt of said control signals enabling the electrical system of the automobile, and a circuit for disabling the electrical system upon detecting nonstandard connections to the electrical system when the logic circuit is not in receipt of control signals.

2. The circuit according to claim 1 wherein the antitheft circuit disables functions of the automobile vital to the operation thereof, including power to fuel pump and ignition circuits, upon detecting the nonstandard connections.

3. The circuit according to claim 1 wherein the key circuit includes an EPROM programmable for up to 254 different combinations of control signals.

4. The circuit according to claim 1 wherein the antitheft circuit includes means to lockup the electrical system until the key circuit is properly actuated.

* * * * *